(12) United States Patent
Wu et al.

(10) Patent No.: US 6,258,905 B1
(45) Date of Patent: Jul. 10, 2001

(54) STABILIZED, UNIMOLECULAR INITIATORS FOR HYDROCARBON POLYMERIZATION

(76) Inventors: Zhe Wu, 4515 Jefferson St., Apt. 4; Dekun Wang, 5000 Oak St., #722, both of Kansas City, MO (US) 64111

( * ) Notice: Subject to any disclaimer, the term of this patent is extended or adjusted under 35 U.S.C. 154(b) by 0 days.

(21) Appl. No.: 09/368,335

(22) Filed: Aug. 3, 1999

(51) Int. Cl.[7] .................................. C08F 2/00; C08F 4/00
(52) U.S. Cl. ................... 526/217; 526/219.6; 526/232.1; 526/236; 526/259
(58) Field of Search ............................... 526/217, 219.6, 526/232.1, 236, 259

(56) References Cited

U.S. PATENT DOCUMENTS 5,910,549 * 6/1999 Matyjaszewski et al. ........... 526/217

OTHER PUBLICATIONS

Georges, M.K.; Veregin, R.P.N.; Kazmaier, P.M.; Hammer, G.K; Macromolecules 1993, 26, 2987 (No month).
Kato, M.; Kamigaito, M.; Sawamoto, M.; Higashimura, T. Macromolecules 1995, 28, 1721 (No month).
Wang, J.S.; Matyjaszewski, K.J. Am. Chem. Soc. 1995, 117, 5614 (No month).
Matyjaszewski, K. ACS Symp. Ser. (No month) 1997, 665, 12.

* cited by examiner

Primary Examiner—Nathan M. Nutter
Assistant Examiner—Olga Asinovsky

(57) ABSTRACT

Disclosed are stabilized unimolecular initiator compounds which are useful for initiating living radical polymerization of polymerizable hydrocarbons. The stabilized unimolecular initiator compounds are the reaction products of polymerization initiator radical-forming compounds, such as organo peroxides and azo compounds, and stable radical-forming compounds, wherein the polymerization initiator radicals are capable of initiating polymerization of polymerizable hydrocarbons and the stable radicals, alone, are not capable of initiating polymerization of hydrocarbons. An exemplary stabilized unimolecular initiator compound is 1-benzoylperoxy-2,2,6,6-tetramethyl-1-piperidine which is the reaction product of benzoyl peroxide, (BPO), and 2,2, 6,6-tetramethyl-1-piperidineyloxy, (TEMPO).

8 Claims, No Drawings

STABILIZED, UNIMOLECULAR INITIATORS FOR HYDROCARBON POLYMERIZATION

BACKGROUND OF THE INVENTION

1. Field of the Invention

The present invention relates to novel stabilized unimolecular initiator compounds which have utility as initiators for hydrocarbon polymerization reactions. In particular, the present invention relates to the stabilized unimolecular initiator compounds, methods for making such compounds and methods for polymerizing hydrocarbons using such compounds as initiators.

2. Description of Pertinent Art

Polymerization of unsaturated, substituted or unsubstituted, hydrocarbons in the presence of radical-forming polymerization initiator compounds is well known and widely practiced. In such polymerization reactions, a radical- forming polymerization initiator compound, (for example, benzoyl peroxide), is brought into contact with polymerizable hydrocarbon compounds, (for example, styrene), under conditions of temperature and pressure such that the radical-forming polymerization initiator compound splits into one or more radicals which then combine with molecules of the unsaturated hydrocarbons to form activated centers necessary for the start of a polymer chain. A large number of such radical-forming polymerization initiator compounds are known, including organic peroxides.

Such hydrocarbon polymerization reactions have been improved by addition of stable radical compounds, along with radical forming initiators, to polymerization systems or via reversible atom transfer reactions, for control of stability and concentrations of polymerization propagating radicals in the polymerization reaction mixtures. The improved polymerization reactions are referred to as "living radical polymerizations" The generally used stable radicals are 2,2,6,6-tetramethyl-1-piperridinyloxy, (TEMPO) and organometallic radicals.

Georges, M. K.; Veregin, R. P. N.; Kazmaier, P. M.; Hammer, G. K.:

Macromolecules 1993, 26, 2987.

Kato, M.; Kamigaito, M.; Sawamoto, M.; Higashimura, T.

Macromolecules 1995, 28, 1721.

Wang, J. S.; Matyjaszewski, K. J. Am. Chem. Soc. 1995, 117, 5614.

Matyjaszewski, K. ACS Symp. Ser. 1997, 665, 12.

A living radical polymerization is a radical initiated polymerization reaction where there is no chain transfer or chain termination. That is, the initiator radicals are all attached to the end of polymer chains and remain active even at complete consumption of all the hydrocarbon monomers. Upon addition of more polymerizable hydrocarbons, monomers or polymers, the attached radicals will initiate further polymerization under polymerization reaction conditions. Characteristics of living radical polymerizations are, (1) the polymers prepared have narrow molecular weight distribution, (polydispersity index, (Mw/MN),<1.3), and (2) block copolymers can be readily synthesized by adding additional monomers to a polymer product of a living radical polymerization and bring ing the mixture to polymerization conditions, without addition of additional initiators.

The living radical polymerization reactions initiated with two component initiator-stable radical systems usually exhibit much slower polymerization rates because of the requirement for the presence of excess stable radicals in order to allow precise control of polymer structures and properties. Recent developments in living radical polymerization reactions allow synthesis of a wide variety of new polymers and, in particular, finctionalized polymers with predetermined molecular weights and properties.

Solomon, D. H.; Rizzardo, E.; Cacioli, P. Chem Abstr. 1985, 102221335 9

Rizzardo, E. Chem. Aust. 1987. 54, 32.

Colombani, D. Prog. Polym. Sci. 1997, 22, 1649.

Georges, M. K.; Veregin, R. P. N.; Kazmaier, P. M.; Hammer, G. K.

Macromol. Symp. 1994, 88, 89.

Recently, stabilized unimolecular initiators have been developed for use in initiating living radical polymerizations. These stabilized unimolecular initiators have facilitated construction of complex macromolecular architectures. The primary stabilized unimolecular initiator compound is:

$$\text{1-benzyloxy-2-phenyl-2-( 2'2',6',6'-tetramethyl-1-piperidinyloxy) ethane} \quad (1)$$

Hawker, C. J. J. Am. Chem. Soc. 1994, 116 11185

Braslau, R.; Burrill, L. C., II; Siano, M.; Naik, N.; Howden, R. K.; Mahal, L. K.

Macromolecules 1997, 30, 6445.

The stabilzed unimolecular initiator,(1) above, is the reaction product of benzoyl peroxide, styrene, and 2,2,6,6-tetramethyl-1-piperidinyloxy. The synthesis reaction requires a large excess of styrene, prolonged reaction at elevated temperature and extensive isolation and purification processes. The low yield, (~40%), has limited practical commercial use of stabilized unimolecular initiator (1).

SUMMARY OF THE INVENTION

Now, according to the present invention, We have discovered novel stabilized unimolecular initiators and methods for their synthesis, which initiators have utility in polymerization, particularly living radical polymerization, of polymerizable hydrocarbons.

The stabilized unimolecular initiators of the present invention comprise the reaction product of a radical-forming polymerization initiator compound and a stabilized radical compound. Such stabilized unimolecular initiators may be economically synthesized under moderate reaction conditions and recoverd in good yield for use in large scale synthesis of hydrocarbon polymers.

DETAILED DESCRIPTION OF THE INVENTION AND PREFERRED EMBODIMENTS

The stabilzed unimolecular initiators of the present invention are each the reaction product of a radical-forming polymerization initiator compound and a stabilized radical compound.

The radical-forming initiator compounds useful for synthesis of the stabilized unimolecular compounds of the present invention are those which initiate chain polymerization reactions of polymerizable hydrocarbon compounds. The stabilized radical compounds are those which, when reacted with a radical-forming polymerization initiator compound, form reaction products, (the stabilized unimolecular initiators), which will initiate chain polymerization reactions among polymerizable hydrocarbon compounds.

Many radical-forming initiator compounds are known. Useful in the present invention are those radical-forming polymerization initiator compounds which, upon reaction with stable radical compounds, form stabilized unimolecular initiator compounds which will initiate polymerization chain reactions among polymerizable hydrocarbons. Non limiting examples of such radical-forming polymerization initiator compounds useful in the present invention are organo peroxides and azo compounds. For example:

benzoyl peroxide; acetyl peroxide; dilauroyl peroxide;

succinic acid peroxide, dicumyl peroxide; di-tert-butyl peroxide;

2,4-dichlorobenzoyl peroxide; isononanoyl peroxide; decanoyl peroxide;

propionyl peroxide; 2,2-bis(t-butylperoxybutane); dibenzyl peroxydicarbonate;

dicyclohexyl peroxydicarbonate;

2,2'-azobisisobutyronitrile; dimethyl 2,2'-azobisisobutyrate; 2,2'-azobis(2-methylbutyronitrile);

and 1,1'-azobis(1-cyclohexanecarbonitrile).

Stable radical compounds useful in the present invention are those which react with radical-forming polymerization initiator compounds to form stabilized unimolecular polymerization initiator compounds. The stable radicals useful in the present invention are those which cannot initiate the polymerization of hydrocarbons by themselves in the reaction conditions, but which can combine with the radical-forming initiators useful in the present invention. Non limiting examples of stabilized radical compounds which may be used in the present invention include:

2,2,6,6-tetramethyl-1-piperidinyloxy;

4-oxo-2,2,6,6-tetramethyl-1-piperidinyloxy;

4-hydroxy-2,2,6,6-tetramethyl-1-piperidinyloxybenzoate;

4-hydroxy-2,2,6,6-tetramethyl-1-piperidinyloxymesylate;

4-amino-2,2,6,6-tetramethyl-1-piperidinyloxy;

N-(2,2,6,6-tetramethylpiperidine-1-oxy-4-yl)maleimide;

succinimidyl 2,2,5,5-tetramethyl-3-pyrroline-1-oxy-3-carboxylate;

4-(N,N-dimethyl-N-(sulopropyl)) ammonium-2,2,6,6-tetramethyl-piperidine-1-oxyl;

di-tert-butylnitroxide.

The stabilized unimolecular initiators of the present invention may be synthesized under mild conditions and recovered in high yield compared to the known stabilized unimolecular initiators of the prior art. Reactions of radical-forming initiator compounds and stabile radical compounds to form stabilized unimolecular initiators are carried out under conditions of temperature and pressure sufficient to maintain the reaction mixtures in the liquid phase. Reaction temperatures are preferably in the range of about 60° C. to about 150° C. Lower temperatures slow the rate of reaction and higher temperatures result in decomposition of the reactants and increase impurities as a result of side reactions. Some combinations of reactants require heating to elevated temperatures to accomplish the reaction, other combinations of reactants are highly exothermic and require inert solvents as diluents to control reaction temperatures. Inert solvents, (such as benzene, tolulene, chlorobenzene and xylene), in which reactants and products are soluble, are often used, both to control reaction temperatures and to maintain the reaction mixture in the liquid phase. Appropriate reaction conditions for particular reactants are easily determined by experiment.

Preferred radical-forming polymerization initiator compounds for use in the present invention are benzoyl peroxide, ("BPO") and 2,2'-azobisisobutyronitrile, ("AIBN").

Examples 1 and 2, below, demonstrate synthesis of stabilized unimolecular initiators of the present invention and Examples 3–5, below, demonstrate utility of the stabilized unimolecular initiators of the present invention for polymerization of unsaturated hydrocarbons.

In the Examples, the benzoyl peroxide, (BPO), azobisisobutyronitrile, (AIBN), and 2,2,6,6-tetramethyl-1-piperidinyloxy, (TEMPO), were purchased from Aldrich Chemicals and used as received. Polymerization monomers were purified by distillation under vacuum before polymerization. Benzene was distilled from sodium benzolphenone ketyl. $^1$H NMR spectra were measured by a Brucker AM 250 (250 MHz) spectrometer. $^{13}$C NMR spectra were recorded at 62.9 MHz on a Brucker AM 250 spectrometer.

Polymer molecular weights were estimated from gel permeation chromatography, (GPC), equipped with a Waters 410-differential refractometer. A flow rate of 1.0 mL/min was used and samples were prepared in tetrahydrofuran, (THF). Polystyrene standards were used for calibration. Polydispersity index, (PDI), was determined by the ratio of weight average molecular weight, (Mw), to number average molecular weight, (MN).

EXAMPLE 1

Synthesis of 1-benzoylperoxy-2,2,6,6-tetramethyl-1-piperidine (2)

To a solution of BPO, (1.236 g, 5 mmol), in dry benzene, (10 mL), was added dropwise a solution of TEMPO in benzene, (10 mL, 1M), (Caution! exothermic explosion could occur if BPO and TEMPO were mixed directly!) After addition, the reaction mixture was refluxed under nitrogen for 1 h. A pink solid was obtained after evaporation of the benzene solvent. The crude mixture was further purified by recrystallization from a mixture of ether/pentane to yield 2.268 g, (80–90% yield) of a white solid.

Analysis of the reaction product:

MP.: 98.0–99.5° C.

IR(Nujol mull, cm–1):3018, 2985, 2947, 1717, 1601, 1386.

$^1$H NMR (CD Cl$_3$, 250 MHz): δ (ppm) 8.08 (d, J=6.5 Hz, 2H), 7.40 (m, 3H), 1.70–1.65 (m, 6H), 1.40 (s, 12H). $^{13}$C NMR (CD Cl$_3$): δ (ppm) 174.22, 135.51, 131.42, 129.87, 127.99, 65.60, 37.39, 27.99, 20.54, 16.22.

Analysis, Calculated for C$_{16}$H$_{23}$NO$_3$: C, 69.29; H, 8.36; N, 5.05

Found: C, 69.02; H, 8.97; N, 5.06.

EXAMPLE 2

Synthesis of 1-(2'-Cyano-2'-propoxy)-2,2,6,6-tetramethylpiperidine, (3)

A solution of TEMPO (1.611 g, 97%, 10 mmol) and AIBN (0.8281 g, 5 mmol) in benzene (10 mL) was heated at 60° C. for 4 h. Benzene solvent was evaporated and the crude product was purified by flash chromotography on silica gel eluted with ethyl acetate/hexane (1:5). A pink oil (1.8 g, 82% yield) was obtained. Analysis of Reaction Product:

$^1$H NMR (C$_6$D$_6$): δ (ppm) 1.40 (s,6H), 1.31 (br., 6H), 1.16 (s, 6H), 1.06 ppm (s, 6H). $^{13}$C NMR (CDCl$_3$): δ (ppm) 113.97, 65.99, 51.22, 31.96, 25.92, 18.98, 18.36, 11.95, 8.43.

IR (neat-KBr plate, cm-1): 2990, 2985, 2200, 1495, 1450.

General Procedure for Polymerization Reactions. All polymerization reactions were performed in a nitrogen filled Schlenk tube equipped with a teflon valve. Initiator, (2 or 3), was dissolved in the monomers. Reaction mixtures were degassed three times, using a freeze-pump-thaw cycle, and were heated in an oil bath to the desired temperatures. Polymers were isolated by precipitation in methanol and dried in vacuo.

EXAMPLE 3

Polymerization of Styrene With Initiator 2 of Example 1

A solution of initiator 2, (200 mg, 0.72 mmol), dissolved in styrene, (7.10 g, 68.3 mmol), was degassed three times using a freeze-pump-thaw cycle. The tube was filled with $N_2$ and heated to 130° C. with stirring. As the polymerization proceeded, the viscosity of the system increased gradually and the reaction was stopped after 30 h. After the mixture was cooled to room temperature, methylene chloride, (30 mL), was added to dissolve the polymer. The solution was precipitated into methanol, (200 mL), to give a white powder, (6.53 g, 92% yield). GPS results: $M_n$=18,000 with a molecular weight distribution of 1.11; Mw=22,000; PDI= 1.12

EXAMPLE 4

Polymerization of Styrene With Initiator 3 of Example 2

The polymerization process of Example 3 was repeated using initiator 3 in place of initiator 2. Upon recovery, the polymer product had a $M_n$ of 11,000 and a molecular weight distribution of 1.19.

EXAMPLE 5

Synthesis of Block Copolymer

A solution was prepared comprising tert-butylstyrene, (200 mg), and polystyrene, (200 mg, Mw=10,400, $M_n$=9,400, PDI=1.12, prepared according to the method of Example 3, employing initiator 2). The solution was heated to 130° C. and polymerization reinitiated without addition of additional initiator. After heating for 8 h, the reaction mixture solidified. The copolymer product, (281 mg, 70% yield), was isolated according to the method of Example 3.

GPC results: Mw=22,000; $M_n$=16,400; and PDI=1.34, which results indicate formation of block copolymers.

This copolymerization reaction, performed without additional initiator, indicates that hydrocarbon polymers synthesized employing the stabilized unimolecular initiators of the present invention contain fragments of the initiators and that such polymer syntheses are living radical polymerizations.

While the invention has been disclosed and described in detail in the foregoing description and examples, the same are to be considered illustrative only and not limiting in character, and that many modifications and changes may be made by those skilled in the art without departing from the spirit and scope of the invention which is defined only by the appended claims.

We claim and wish to protect by Letters Patent:

1. A stabilized unimolecular initiator compound for hydrocarbon polymerization reactions comprising the reaction product of a radical-forming polymerization initiator compound selected from the group consisting of organo peroxides and a stable radical compound.

2. A method for synthesizing a stabilized unimolecular initiator comprising reacting stoichiometric amounts of a radical-forming initiator and a stable radical compound, in the liquid phase, in the presence of an inert solvent, to form a reaction mixture and recovering the stabilized unimolecular initiator from the reaction mixture.

3. The method of claim 2, wherein the reaction mixture is maintained at a temperature in the range from about 60° C. to about 150° C.

4. The method of claim 2, wherein
The radical-forming initiator is selected from the group consisting of:
benzoyl peroxide; acetyl peroxide; dilauroyl peroxide; succinic acid peroxide, dicumyl peroxide; di-tert-butyl peroxide;
2,4-dichlorobenzoyl peroxide; isononanoyl peroxide; decanoyl peroxide;
propionyl peroxide; 2,2-bis(t-butylperoxybutane); dibenzyl
peroxydicarbonate; dicyclohexyl peroxydicarbonate; and
the stable radical compound is selected from the group consisting of
2,2,6,6-tetramethyl-1-piperidinyloxy;
4-oxo-2,2,6,6-tetramethyl-1-piperidinyloxy;
4-hydroxy-2,2,6,6-tetramethyl-1-piperidinyloxybenzoate;
4-hydroxy-2,2,6,6-tetramethyl-1-piperidinyloxymesylate;
4-amino-2,2,6,6-tetramethyl-1-piperidinyloxy;
N-(2,2,6,6-tetramethylpiperidine-1-oxy-4-yl) maleimide;
succinimidyl 2,2,5,5-tetramethyl-3-pyrroline-1-oxy-3-carboxylate;
4-(N,N-dimethyl-N-(sulopropyl))ammonium-2,2,6,6-tetramethyl-piperidine-1-oxyl; and
di-tert-butylnitroxide.

5. A method for polymerizing an unsaturated, polymerizable hydrocarbon which comprises reacting a stabilized unimolecular initiator compound comprising the reaction product of a radical-forming initiator selected from the group consisting of organo peroxides and a stable radical compound with about 25 equivalents to about 1000 equivalents of the polymerizable hydrocarbon at a temperature in the range of about 120° C. to about 130° C. to form a reaction mixture and recovering polymerized hydrocarbon from the reaction mixture.

6. A method for synthesizing block co-polymers from polymerizable hydrocarbons, which method comprises:
reacting a stabilized unimolecular initiator comprising the reaction product of a radical-forming initiator compound selected from the group consisting of organo peroxides and a stable radical compound with from about 25 to about 1000 equivalents of a first polymerizable hydrocarbon at a temperature of about 120° C. to about 130° C., forming a first hydrocarbon polymer;
recovering the first hydrocarbon polymer; and reacting, without additional polymerization initiator, the first hydrocarbon polymer with a second polymerizable hydrocarbon at a temperature from about 120° C. to about 130° C., forming a block co-polymer comprised of the first hydrocarbon polymer and the second polymerizable hydrocarbon.

7. The stabilized unimolecular initiator compound of claim 1 comprising:
the reaction product of: a radical-forming initiator selected from the group consisting of:
benzoyl peroxide, acetyl peroxide; dilauroyl peroxide; succinic acid peroxide, dicumyl peroxide; di-tert-butyl peroxide;

2,4-dichlorobenzoyl peroxide; isononanoyl peroxide; decanoyl peroxide;
propionyl peroxide; 2,2-bis(t-butylperoxybutane);
dibenzyl peroxydicarbonate; dicyclohexyl peroxydicarbonate;
and a stabile radical compound selected from the group consisting of:
2,2,6,6-tetramethyl-1-piperidinyloxy;
4-oxo-2,2,6,6-tetramethyl-1-piperidinyloxy;
4-hydroxy-2,2,6,6-tetramethyl-1-piperidinyloxybenzoate;
4-hydroxy-2,2,6,6-tetramethyl-1-piperidinyloxymesylate;
4-amino-2,2,6,6-tetramethyl-1-piperidinyloxy;
N-(2,2,6,6-tetramethylpiperidine-1-oxy-4-yl) maleimide;
succinimidyl 2,2,5,5-tetramethyl-3-pyrroline-1-oxy-3-carboxylate;
4-(N,N-dimethyl-N-(sulopropyl))ammonium-2,2,6,6-tetramethyl-piperidine-1-oxyl; and di-tert-butylnitroxide.

8. The unimolecular stabilized initiator compound of claim 1 comprising 1-benzoylperoxy-2,2,6,6-tetramethyl-1-piperridine.

* * * * *